(12) United States Patent
Okamura et al.

(10) Patent No.: US 6,317,343 B1
(45) Date of Patent: Nov. 13, 2001

(54) CAPACITOR POWER SUPPLY WITH SWITCHES TO DECREASE VARIATIONS IN OUTPUT VOLTAGE

(75) Inventors: Michio Okamura; Masaaki Yamagishi, both of Kanagawa; Akinori Mogami, Tokyo, all of (JP)

(73) Assignees: JEOL Ltd.; Okamura Laboratory, Inc.; Kabushiki Kaisha Powersystems, all of (JP)

(*) Notice: Subject to any disclaimer, the term of this patent is extended or adjusted under 35 U.S.C. 154(b) by 0 days.

(21) Appl. No.: 09/516,570

(22) Filed: Mar. 1, 2000

(30) Foreign Application Priority Data

Mar. 1, 1999 (JP) .................................................. 11-052411

(51) Int. Cl.$^7$ ....................................................... H02M 3/18
(52) U.S. Cl. ............................................. 363/59; 307/109
(58) Field of Search .................................... 307/110, 109; 363/59, 60

(56) References Cited

U.S. PATENT DOCUMENTS 4,667,280 * 5/1987 Takamura et al. ..................... 363/61
5,734,205 * 3/1998 Okamura et al. ..................... 307/110
5,886,887 * 3/1999 Jenq ....................................... 363/60

* cited by examiner

Primary Examiner—Adolf Deneke Berhane
(74) Attorney, Agent, or Firm—Webb Ziesenheim Logsdon Orkin & Hanson, P.C.

(57) ABSTRACT

There is disclosed a power supply system comprising capacitors that are connected switchably via a small number of switches to decrease variations of an output voltage. The switches comprise a series connection switch and first and second sets of switches. A control means controls the first set of switches, the second set of switches, and the series connection switch to switch connection of the capacitors of the first and second sets among a first state in which the first set of capacitors is connected in series with the second set of capacitors, a second state in which the first set of capacitors is connected in parallel with the second set of capacitors, and a third state in which one or more capacitors of the first set are connected in parallel with one or more capacitors of the second set.

9 Claims, 11 Drawing Sheets

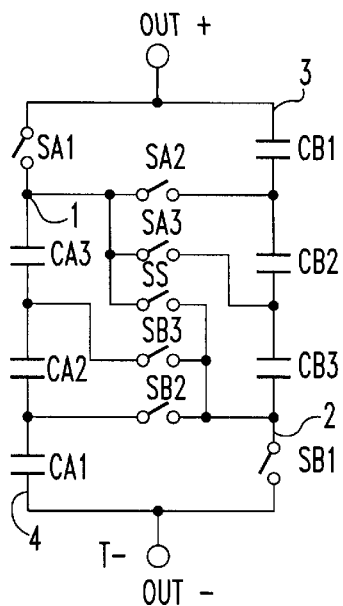 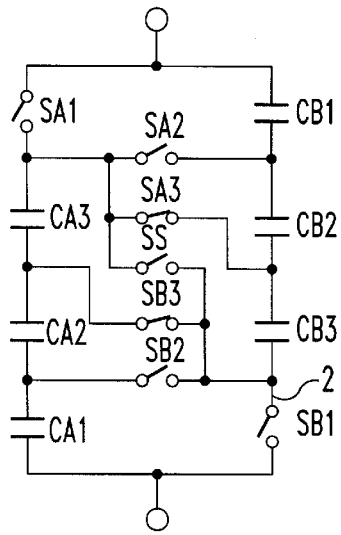 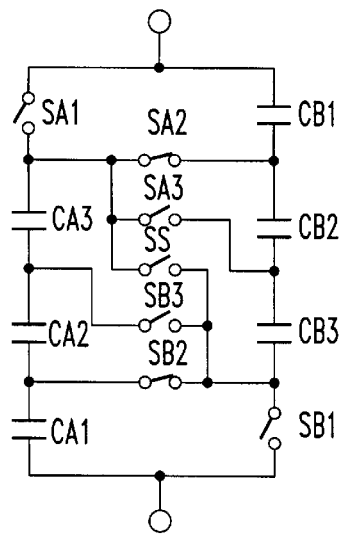
FIG.1(A)  FIG.1(B)  FIG.1(C)
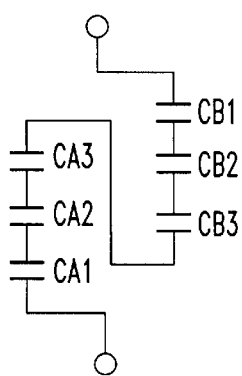 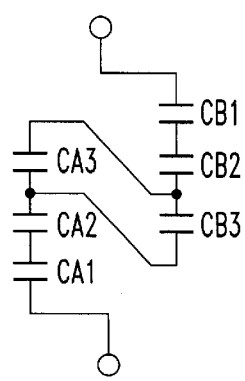 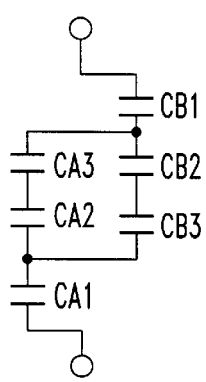 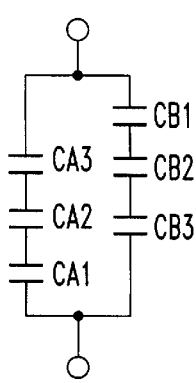
FIG.1(D)  FIG.1(E)  FIG.1(F)  FIG.1(G)

$\begin{pmatrix}SA\\SB\end{pmatrix}=P1$ $\begin{pmatrix}SA\\SB\end{pmatrix}=P2$ $\begin{pmatrix}SA\\SB\end{pmatrix}=P3$

CAPACITOR POWER SUPPLY WITH SWITCHES TO DECREASE VARIATIONS IN OUTPUT VOLTAGE

BACKGROUND OF THE INVENTION

1. Field of the Invention

The present invention relates to a power supply system comprising capacitors that are switchably connected to decrease variations of an output voltage.

2. Description of the Related Art

An electric double-layer capacitor is physically charged and, hence, can be charged more quickly than chemical batteries, such as lead-acid batteries and nickel/cadmium batteries. However, a power supply system using electric double-layer capacitors produces a terminal voltage V that varies greatly given by equation $Q=CV^2/2$. An electrical energy storage system making use of the energy capacitor system (ECS) using electric double-layer capacitors has attracted attention as a power supply for an electric vehicle or as a large-scale electrical energy storage system.

The ECS has been introduced in various literature (e.g., *Electronic Technology of Japan*, 1994, 12, pp. 1–3; T.EEE Japan, in Japanese, B, Vol. 115, No. 5, 1995, pp. 504–610) as an electric energy storage system consisting of capacitors, parallel monitors, and current pumps. These capacitors are connected in series to form a capacitor bank. The parallel monitors are connected across the respective capacitors of the bank. When the capacitors are charged to more than a value set for the parallel monitors, these monitors bypass the charging current or discharge the capacitors until the terminal voltage reaches the set voltage. In this way, the state of charge of the capacitors is controlled. The parallel monitors may also be connected across the capacitor banks.

These parallel monitors act to make uniform the maximum voltages, prevent reverse currents, detect the terminal voltages on completion of charging, and perform controlled operation even if the capacitors have nonuniform characteristics and varying amounts of residual charge. Therefore, the parallel monitors are quite important in making almost full use of the capability of the capacitor bank to store electrical energy.

On the other hand, in a power supply system using capacitors whose terminal voltages vary widely at a high rate as energy is drawn from the fully charged state, it is required to suppress variations in the output voltage due to variations in the terminal voltages of the capacitors.

Therefore, a power supply system for switching capacitors between series connection and parallel connection to reduce variations in the voltage has been proposed as disclosed in U.S. Pat. No. 5,734,205. FIGS. 11(A), 11(B), and 11(C) show examples of the structure of a power supply system in which capacitors are switched between series connection and parallel connection. In this configuration, as the terminal voltage drops, the capacitors are switched from parallel connections to series connections.

A series-parallel switching circuit for capacitors C1 and C2 of this power supply system is shown in FIG. 11(A). The state is switched to a state shown in FIG. 11(B), where more stages are cascaded. In this way, the state is varied in a stepwise fashion according to the state of charge. Consequently, variations in voltage can be reduced further with increasing the number of stages.

Where the voltage variations are reduced by the method described above, a large number of stages are switched from parallel to series connection. As the number of stages increases, more switches are necessary. That is, as can be seen from FIG. 11(A), three switches Sp1, Sp2, and Ss1 are used in one stage and so three switches are required for each stage.

Furthermore, these switches are used in power applications. Hence, use of large-sized electromagnetic contactors or power semiconductor devices, such as giant transistors, IGBTS, GTOs, and thyristors, is necessary. Therefore, the number of components including driver circuits for the switches and radiators is increased. Also, a large space is necessary to mount them. As a result, the cost of the system is increased. Furthermore, the reliability of the switches poses problems.

In addition, when the connection is switched from parallel to series, if the voltages across the capacitors C1 and C2 are not uniform, a large crosscurrent flows between the capacitors C1 and C2. To prevent this crosscurrent, protective circuits A1, A2, and corresponding switching elements Q1–Q3 are necessary, as shown in FIG. 11(C).

SUMMARY OF THE INVENTION

The present invention is intended to solve the foregoing problems.

It is an object of the present invention to provide a power supply system comprising capacitors that can be connected switchably via a small number of switches to reduce variations of an output voltage, the system being further characterized in that the switches can be controlled easily to reduce switching loss.

This object is achieved by a power supply system comprising capacitors that are connected switchably via a small number of switches to decrease variations of an output voltage. The power supply system has a first set of capacitors connected in series at their series junctions and a second set of capacitors connected in series at their series junctions. The capacitors of the first set are equal in number with the capacitors of the second set. A series connection switching means is connected with first terminals of the capacitors of these two sets such that the capacitors of the first set are connected in series with the capacitors of the second set. Input/output terminals are connected with second terminals of the capacitors of the two sets which are not connected with the series connection switching means. The first set of capacitors is connected with the series connection switching means at a first series junction. A first set of switching means connects the first series junction with the second terminals of the capacitors of the second set and with the series junctions of the capacitors of the second set. The second set of capacitors is connected with the series connection switching means at a second series junction. A second set of switching means connects the second series junction with the second terminals of the capacitors of the first set and with the series junctions of the capacitors of the first set. A control means controls the first set of switching means, the second set of switching means, and the series connection means to switch connection of the capacitors of the first and second sets among a first state in which the first set of capacitors is connected in series with the second set of capacitors, a second state in which the first set of capacitors is connected in parallel with the second set of capacitors, and a third state in which one or more capacitors of the first set are connected in parallel with one or more capacitors of the second set.

The present invention also provides a power supply system comprising capacitors that can be connected switchably to decrease variations of an output voltage, the system further including a capacitor power supply, a voltage compensation circuit connected in series with the capacitor power supply for making voltage compensation, and a control circuit. The capacitor power supply switches the connection of the capacitors among plural states according to the state of charge. The control circuit controls a compensation voltage at which the voltage compensation circuit provides voltage compensation according to the voltage developed across the capacitor power supply.

Other objects and features of the invention will appear in the course of the description thereof, which follows.

BRIEF DESCRIPTION OF THE DRAWINGS

FIGS. 1(A)–1(G) show circuit diagrams of a power supply system comprising capacitors connected switchably in accordance with the present invention;

DESCRIPTION OF THE PREFERRED EMBODIMENTS

Figure 2A:
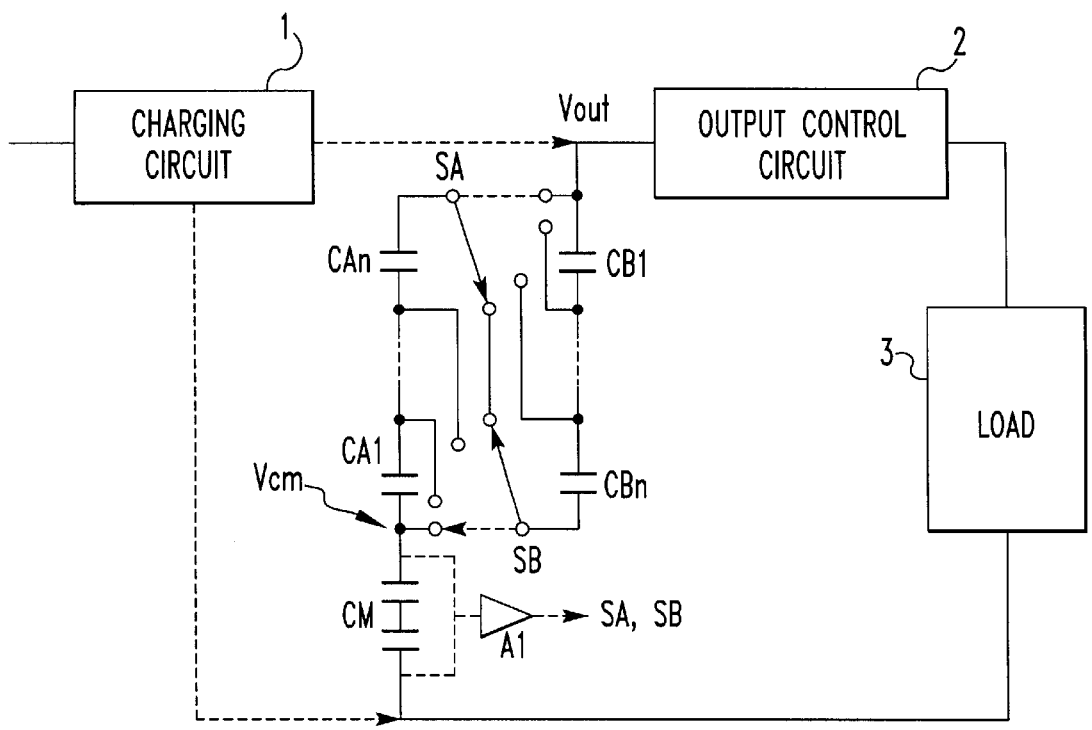
FIGS. 2(A)–2(F) show circuit diagrams of another power supply system comprising capacitors connected switchably in accordance with the present invention.

The preferred embodiments of the present invention are hereinafter described with reference to the accompanying drawings. Referring first to FIGS. 1(A) to 1(G), there is shown a power supply system comprising capacitors connected switchably in accordance with the present invention. The capacitors are indicated by CA1–CA3 and CB1–CB3. The system further includes switches SS, SA1–SA3, and SB1–SB3.

In FIGS. 1(A) to 1(G), the capacitors CA1–CA3 and CB1–CB3 are capacitors (or battery cells), such as electric double-layer capacitors (also known as supercapacitors), that store electrical energy. These capacitors CA1–CA3 and CB1–CB3 form two sets of capacitors A and B, respectively, and are each made up of the same number of capacitors connected in series. Each of the capacitors CA1–CA3 and CB1–CB3 may also be a series combination of capacitors or a bank consisting of a parallel combination of such series combinations of capacitors. If necessary, parallel monitors are appropriately connected.

The switch SS is a series connection switching means for connecting the two sets of capacitors A and B in series. The open ends of the sets of capacitors A and B connected in series by the switch SS are connected to input/output terminals T+ and T−, respectively.

The series junction of one set of capacitors A with the switch SS is indicated by 1. The series junction of the other set of capacitors B with the switch SS is indicated by 2. The switches SA1–SA3 are a set of switches A for connecting the series junction 1 with one end 2 of the capacitor set B and with the series junctions, respectively, of the capacitors CB1–CB3. The switches SB1–SB3 are a set of switches B for connecting the series junction 2 with the other end 4 of one set of capacitors A and with the series junctions, respectively, of the capacitors CA1–CA3.

As shown in FIG. 1(A), when only the switch SS is closed, the set of capacitors A is connected in series with the set of capacitors B, as shown in FIG. 1(D). When the switch SS is opened and the switch SA3 of one set and the corresponding switch SB3 of the other set are closed as shown in FIG. 1(B), the capacitor CA3 of one set A closest to the switch SS and the capacitor CB3 of the other set B closest to the switch SS are connected in parallel as shown in FIG. 1(E). Note that the switches SA3 and SB3 are symmetrical with respect to the series connection switch SS.

Similarly, when the switch SA2 in the set A and the switch SB2 in the other set B which are symmetrical with respect to the series connection switch SS are closed and all the other switches are opened as shown in FIG. 1(C), a series circuit of two capacitors CA3, CA2 in one set A which is closest to the switch SS is connected in parallel with a series circuit of two capacitors CB3 and CB2 in the other set B which is closest to the switch SS as shown in FIG. 1(F).

Furthermore, the two sets of capacitors A and B are connected in parallel with each other by opening the switch SA1 in one set A and the switch SB1 in the other set B which are symmetrical with respect to the switch SS and opening all the other switches as shown in FIG. 1(G).

In the present invention, the connection of the plural capacitors CA1–CA3, CB1–CB3 is switched as shown in FIGS. 1(D)–1(G), by selectively connecting any one switch in the set A, the corresponding switch in the set B (i.e., these two switches are symmetrical with respect to the series connection switch SS) and the switch SS as mentioned above. In this way, the output voltage can be adjusted. Variations in the voltage occurring when the capacitors are charged and discharged can be suppressed.

For example, on charging, the capacitors CA1–CA3, CB1–CB3 are all connected in series as shown in FIG. 1(D). When the voltage Vt developed across the terminals T+ and T− rises to a given value, the connection is switched to the configuration shown in FIG. 1(E). Because the connection of the capacitors CA3 and CB3 is switched to parallel connection, the voltage Vt across the terminals T+ and T− drops. If the charging progresses further and the voltage Vt across the terminals T+ and T− reaches the given value again, the connection is switched to the configurations shown in FIGS. 1(F), 1(G), in turn. Consequently, the capacitors can be charged to full charge while preventing the voltage Vt across the terminals T+ and T− from rising above the given value.

Where the load is fed under a full-charge condition, discharging starts at the connection shown in FIG. 1(G). When the voltage Vt across the terminals T+ and T− drops to the given value Vt, the connection is switched to the configuration shown in FIG. 1(F). The voltage Vt across the terminals T+ and T− rises. If discharging continues and the voltage Vt across the terminals T+ and T− drops to the given value, the connection is switched to the ones shown in FIGS. 1(E), 1(F), in turn. In this way, the voltage Vt across the terminals T+ and T− can be prevented from dropping below the given value.

Of these switches for changing the connection during charging and discharging, only the switch SS that connects all the capacitors CA1–CA3, CB1–CB3 in series bears the full current; the other switches SA1–SA3, SB1–SB3 need to have a current capacity half of the full current. Furthermore, only one switch is connected in series with any capacitor at any time. Therefore, loss due to ON voltage of switches that would normally present problems where semiconductor switches are used can be reduced to a minimum.

Referring next to FIGS. 2(A)–2(F), there is shown another power supply system comprising capacitors connected switchably in accordance with the present invention. This system has capacitors CM, CA1–CAn, CB1–CBn, switches SA, SB, control rectifier elements SS1, SS2, SSA1–SSA3, SSB1–SSB3, rectifier elements SD1, SD2, SDA1–SDA3, SDB1–SDB3, a control circuit A1, a charging circuit 1, and an output control circuit 2. A load 3 is connected into this system.

In FIG. 2(A), the capacitor CM is a main capacitor bank used as an output capacitor and is charged and discharged within the range of the rated voltage of the load. The capacitors CA1–CAn, CB1–CBn are charged and discharged within the tolerable range of the load voltage to adjust the voltage. These voltage-adjusting capacitors CA1–CAn, CB1–CBn are connected in series with the capacitor CM. The voltage is adjusted by switching between series and parallel connection. The switches SA and SB divide the capacitors CA1–CAn, CB1–CBn connected in series with the capacitor CM into the sets A and B, and the connection is switched between series and parallel connection.

The control circuit A1 detects the state of charge (terminal voltage) of the capacitor CM and controls the switches SA, SB according to the state of charge to switch the connection of the capacitors CA1–CAn, CB1–CBn between series and parallel connection. This control circuit A1 switches the switches SA and SB from the positions indicated by the solid lines, at which all the capacitors CA1–CAn, CB1–CBn are connected in series, to the positions indicated by the broken lines, at which the series circuit of the capacitors CA1–CAn of one set A is connected in parallel with the series circuit of the capacitors CB1–CBn of the other set B, in a stepwise fashion.

The charging circuit 1 charges the capacitors CM, CA1–CAn, and CB1–CBn with a constant current from a power source. During charging, the capacitors CA1–CAn, CB1–CBn connected in series with the capacitor CM are switched between series connection and parallel connection in a stepwise manner by the control circuit A1. When the series circuit of the capacitors CA1–CAn of the set A and the series circuit of the capacitors CB1–CBn of the set B are connected in parallel and they are charged to the rated voltage, the charging circuit 1 ends the charging. The output control circuit 2 controls or adjusts the current fed to the load 3 from the capacitors CM, CA1–CAn, and CB1–CBn like a known current pump. When electric power is produced at the load 3, the output control circuit 2 receives the power. At this time, the control circuit 2 serves as a current source and charges the capacitors CM, CA1–CAn, CB1–CBn. That is, in the case of regenerative braking where the load 3 serves as a power generator and produces electric power, the output control circuit 2 operates as a charging circuit.

An electronic switch, step-down chopper, step-up chopper, or other DC/DC converter is used as the output control circuit 2. However, where control of the connection of the capacitors CA1–CAn, CB1–CBn regulates the voltage within a range in which the load 3 needs no adjustment, the output control circuit 2 can be omitted. Consequently, the output control circuit 2 is not indispensable for the present invention. Where the output control circuit is used, if the range in which the voltage varies is narrowed by the control of the connection of the capacitors CA1–CAn, CB1–CBn, then the converter used in combination can be designed highly efficiently, and a power supply with high voltage stability can be accomplished.

Figure 2B:
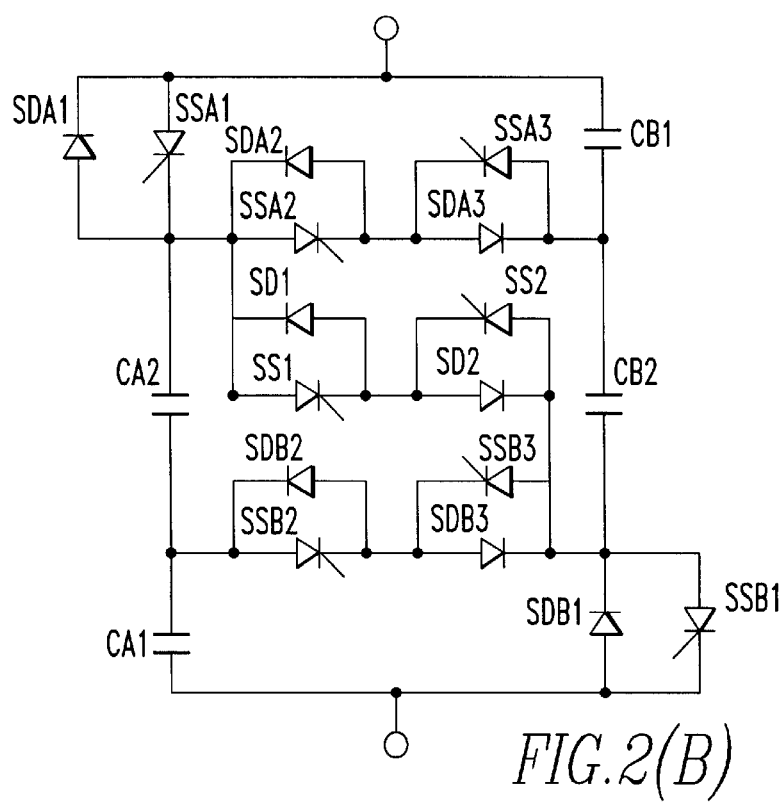

In the present invention, an anti-parallel circuit of unidirectional control rectifier elements SS1, SS2, SSA1–SSA3, SSB1–SSB3, such as thyristors or other semiconductor devices, and rectifier elements SD1, SD2, SDA1–SDA3, SDB–SDB3 consisting of diodes can be used as the switches SA and SB forming a selector circuit, as shown in FIG. 2(B). Of this circuit, a circuit for connecting one end of a series circuit in one set A with the other end of a series circuit in the other set B is made up of the control rectifier element SSA1 and the rectifier element SDA1. A circuit for connecting one end of a series circuit in the other set B with the other end of a series circuit in one set A is composed of the control rectifier element SSB1 and the rectifier element SDB1. The reverse direction (charging direction) control rectifier elements SSA1 and SSB1 are connected in parallel with the discharge direction rectifier elements SDA1 and SDB1. With respect to the other switches, the charging direction control rectifier elements SS2, SSA3, SSB3 are connected in series with the reverse direction control rectifier elements SS1, SSA2, SSB2. The reverse direction rectifier elements SD2, SDA3, SDB3, rectifier elements SD1, SDA2, SDB2 are connected in parallel with those elements, respectively. Of course, circuits with which thyristors (control rectifier elements) are connected anti-parallel or circuits with which (bidirectional control rectifier elements) are connected can be used as the switching circuits described above.

By building the switching circuit by combining the thyristors, triacs, and diodes as described above, the resistance to inrush current increases. Furthermore, long-term ON loss and gate loss can be reduced. In addition, when the connection is switched, the voltages across capacitors are applied to the main pole as a reverse bias. Therefore, it is not necessary to control turnoff. Consequently, the gate control circuit can be simplified. For example, in the circuit of FIG. 2(B), at the start of charging, only the control rectifier element SS2 is turned on and all the others are turned off. As charging progresses, the control rectifier elements SSA3 and SSB3 are first turned on. This turns off the control rectifier element SS2 in a reverse-biased condition. Then, the control rectifier elements SSA1 and SSB1 are turned on, thus turning off the control rectifier elements SSA3 and SSB3 in a reverse-biased condition.

Discharging is commenced under the condition where all the control rectifier elements have been turned off. If a load is connected, the rectifier elements SDA1 and SDB1 conduct, starting charging under the condition where the capacitor sets A and B are connected in parallel. As the discharging progresses and the terminal voltage drops to a given value, the control rectifier elements SSA2 and SSB2 are turned on. That is, the capacitors CA2 and CB2 are connected in parallel. Then, if the terminal voltage drops to a given value, the control rectifier element SS1 is turned on.

At this time, all the capacitors CA1, CA2, CB1, and CB2 are all connected in series.

Figure 3:
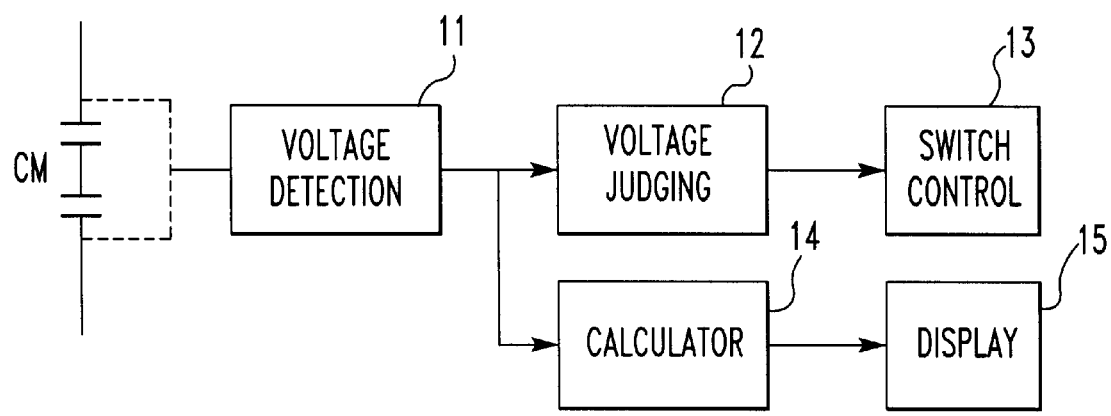
FIG. 3 is a circuit diagram of a control circuit included in the power supply system shown in FIGS. 2(A)–2(F)

In the embodiment shown in FIG. 2(A), the control circuit A1 controls switches according to the voltage across the capacitor CM and switches the connection of the capacitors CA1–CAn, CB1–CBn from series connection to parallel connection. The charging and discharging operation of this control circuit A1 is described. FIG. 3 is a diagram showing an example of configuration of the control circuit A1.

Figure 4:
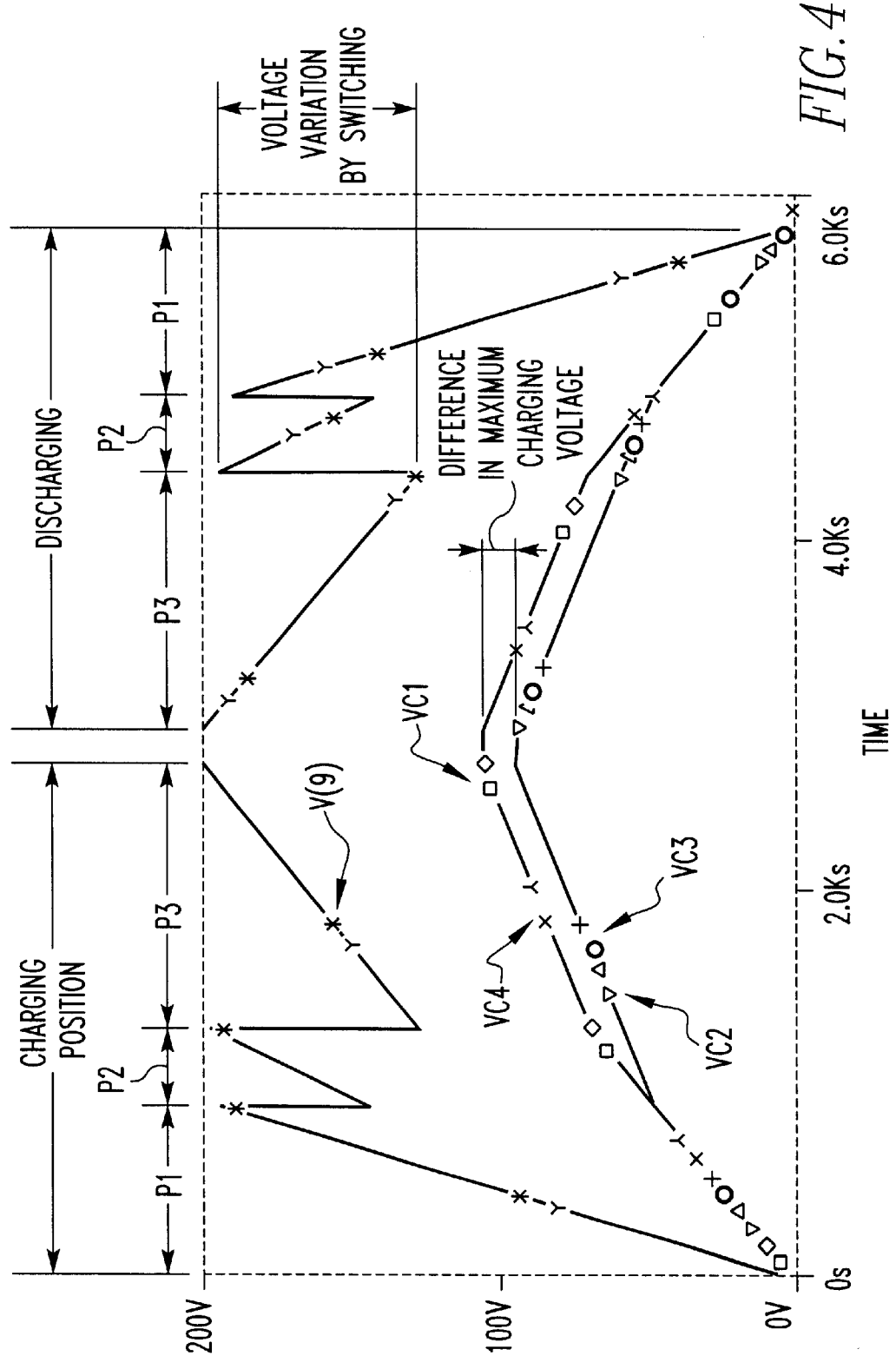
FIG. 4 is a graph showing voltage traces produced when connection of capacitors CA1, CA2, CB1, and CB2 is switched between series and parallel connection.
Figure 5:
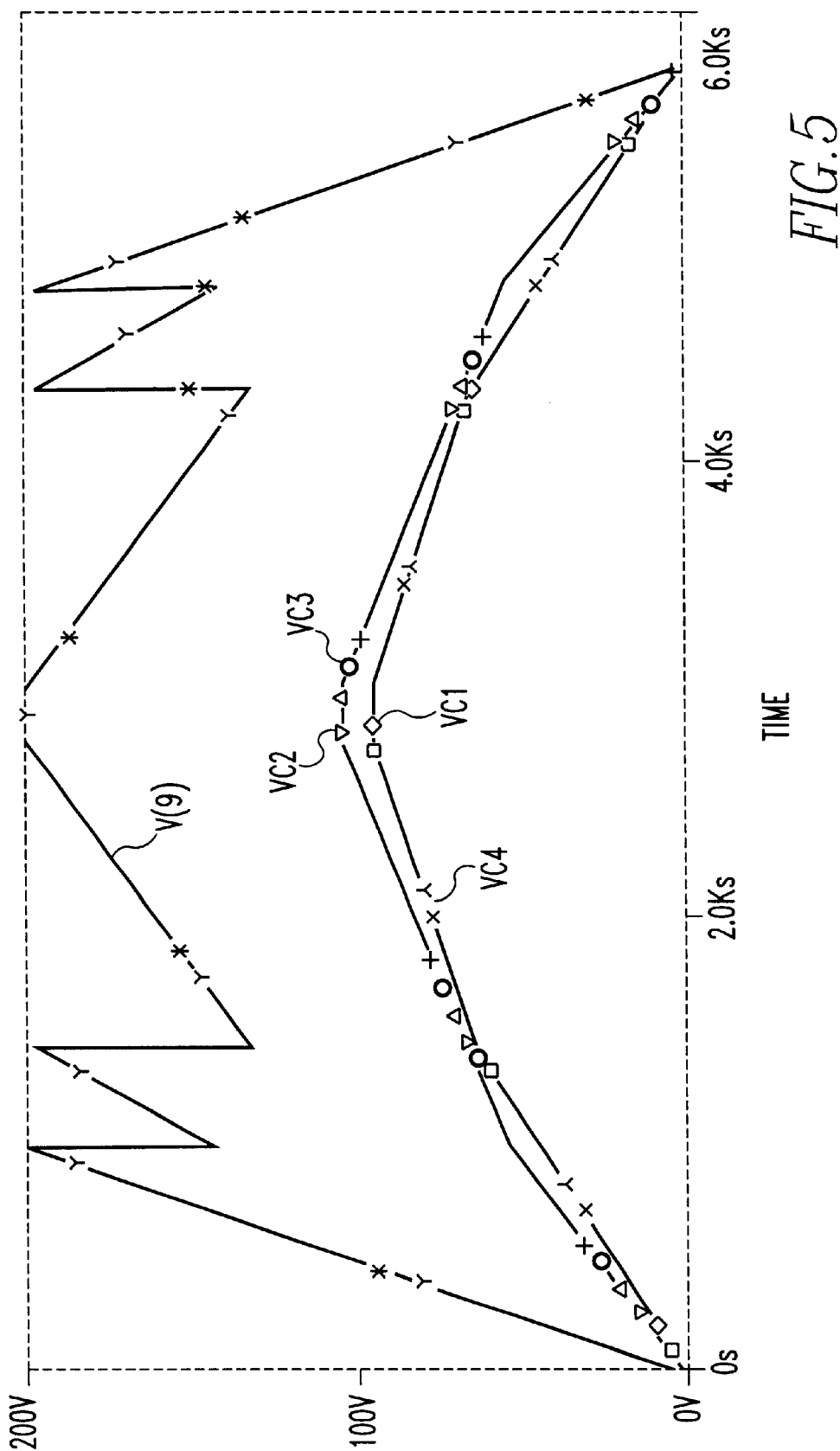
FIG. 5 is a graph showing voltage traces produced when connection of capacitors CA1, CA2, CB1, and CB2 is switched between series and parallel connection.
Figure 6:
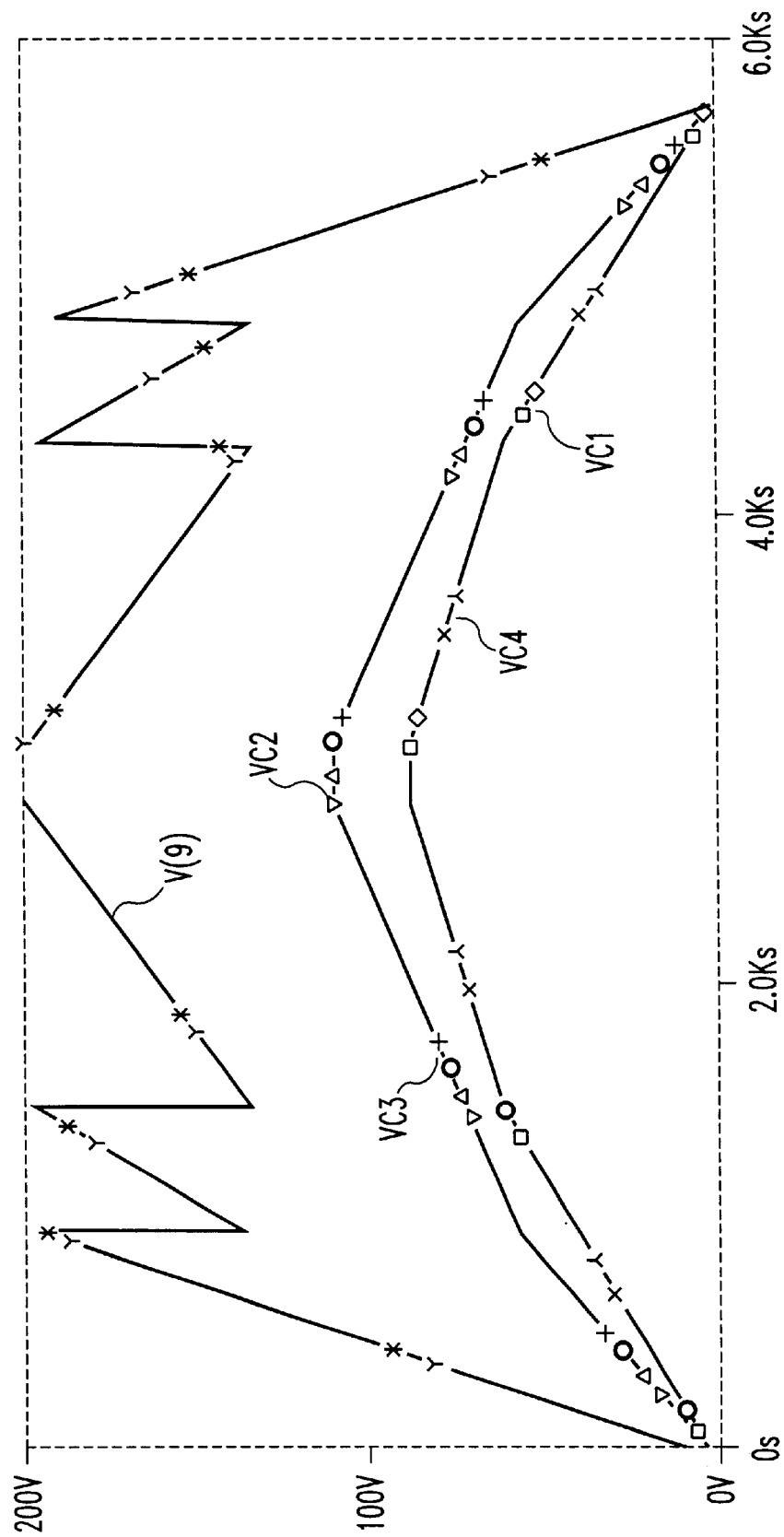
FIG. 6 is a graph showing voltage traces when connection of capacitors CA1, CA2, CB1, and CB2 is switched between series and parallel connection.

FIGS. 4–6 show examples of voltage traces produced as a result of switching from series to parallel connection of the capacitors CA1, CA2, CB1, and CB2.

In the control circuit A1 shown in FIGS. 2(A)–2(F), the voltage V developed across the output capacitor CM is measured, the capacitor CM being charged and discharged within the range of the rated voltage of the load. The state of charge is detected, based on the voltage V. The residual amount of energy can also be found from the voltage V. An example of a control circuit having a function of displaying or indicating the residual amount of energy is shown in FIG. 3. A voltage detection circuit 11 measures the voltage V developed across the output main capacitor CM. A voltage-judging circuit 12 judges the voltage from the voltage V, i.e., judges the state of charge. A switch control circuit 13 turns on and off the switches according to the result of the decision made by the voltage-judging circuit 12. A residual amount-calculation circuit 14 calculates the amount of residual energy from the voltage V. A display circuit 15 displays the amount of residual energy calculated by the residual amount-calculation circuit 14.

The circuit of FIG. 2(B) for switching the connection of the capacitors CA1, CA2, CB1, and CB2 between series and parallel connection is modeled, and all the capacitors are assumed to have the same capacitance.

Figure 2C:
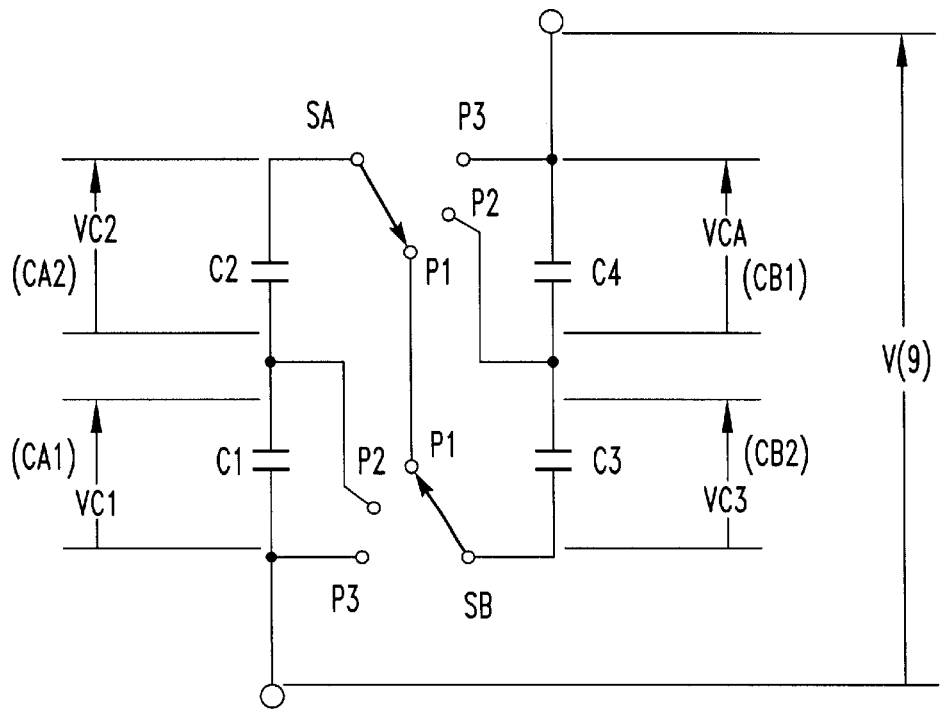
Figure 2D:
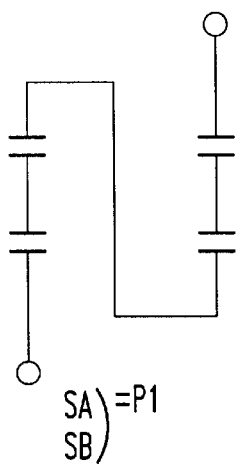
Figure 2E:
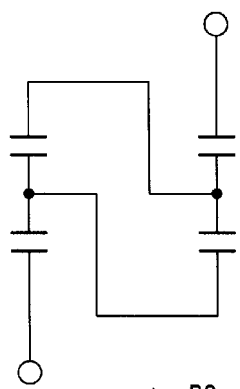
Figure 2F:
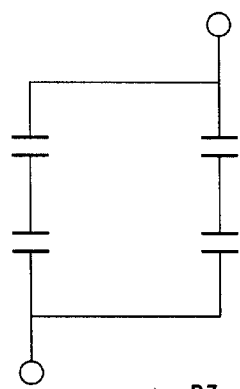

The example shown in FIG. 2(C) corresponds to a case of FIG. 2(A), wherein n is selected to 2. As shown in FIG. 2(C), four capacitors C1–C4 and switches SA and SB are included. The switches SA and SB have three selecting positions P1–P3. FIGS. 2(D), 2(E), and 2(F) show equivalent circuits corresponding to these positions.

FIGS. 4–6 show voltage traces in the example as shown in FIG. 2(C). In these figures, VC1–VC4 and V(9) are inserted for identification. During charging, switches SA and SB are switched from P1 to P2 and next to P3 and during discharging from P3 to P2 and next to P1.

In the example shown in FIG. 4, all the capacitors are assumed to have the same capacitance. In the example shown in FIG. 5, capacitors C1 and C4 are equal in capacitance and capacitors C2 and C3 are equal in capacitance, however, capacitance of these couples are different, namely, C1 or C4>C2 or C2 or C3. The ratio K is selected to 1.1. In the example shown in FIG. 6, the ratio K is selected to 1.2.

From FIGS. 4–6, it can be understood that the voltage variation of the output voltage V(9) caused by switching can be reduced by increasing the ratio K, however, the difference in maximum charging voltage of each couple of capacitors is observed to increase.

The resulting voltage trace is shown in FIG. 4. In this case, a heavy voltage burden is imposed on the capacitors CA1 and CB1. Therefore, capacitors CA1, CB1 and capacitors CA2, CB2 that are different in capacitance are used. In FIG. 5, the ratio K of the capacitance of the capacitors CA1 and CB1 to the capacitance of the capacitors CA2 and CB2 is set to 1.1. Under this condition, the voltage trace was analyzed. At K=1.2, analysis was performed, and the results are shown in FIG. 6. Where the capacitance difference is made large in this way, the output voltage varies in smaller steps. However, the difference in maximum charging voltage is observed to increase.

As can be seen from the top voltage trace line of the capacitor CM, the terminal voltage of the capacitor CM holds a certain relation to the amount of residual storage energy in the system. It is known that the energy U stored in a capacitor having capacitance C can be given by $U=CV^2/2$, where V is the terminal voltage. Accordingly, the terminal voltage of the capacitor CM is measured, and the terminal voltage V can be converted into the amount of residual storage energy, i.e., the amount of electrical storage energy, using this relation. The amount of the residual energy can be displayed by displaying the result of the conversion. The conversion based on the formula described above can be carried out in practice, using an arithmetic means or a circuit approximating a bent line of squares or root mean square.

Where the connection of plural capacitors of the power supply system are switched in a stepwise fashion according to the state of charge as described above to suppress variations in the voltage within a desired range, variations in the voltage can be reduced further with small capacitances and high efficiency by adding simple voltage-compensating circuits. Examples of the structure are given below.

Figure 7A:
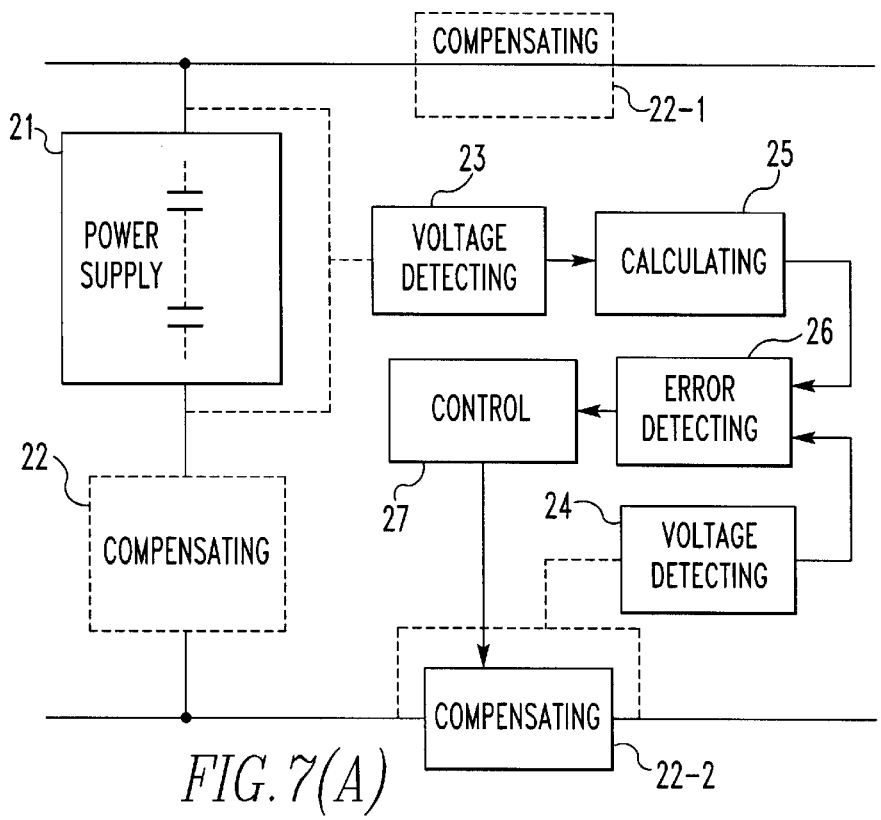
FIGS. 7(A)–7(C) show circuit diagrams of a further power supply system comprising capacitors connected switchably in accordance with the present invention.
Figure 7B:
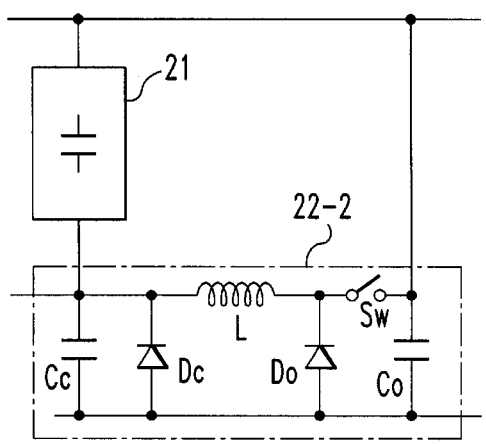
Figure 7C:
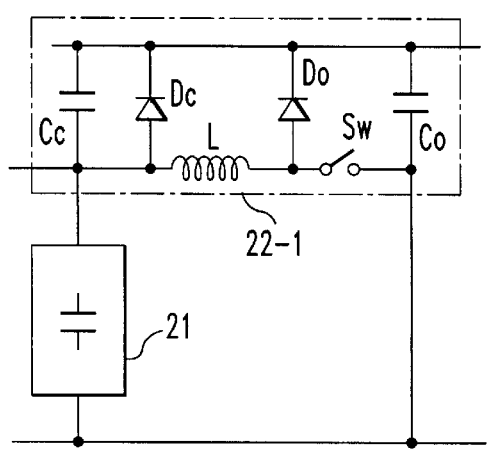
Figure 8A:
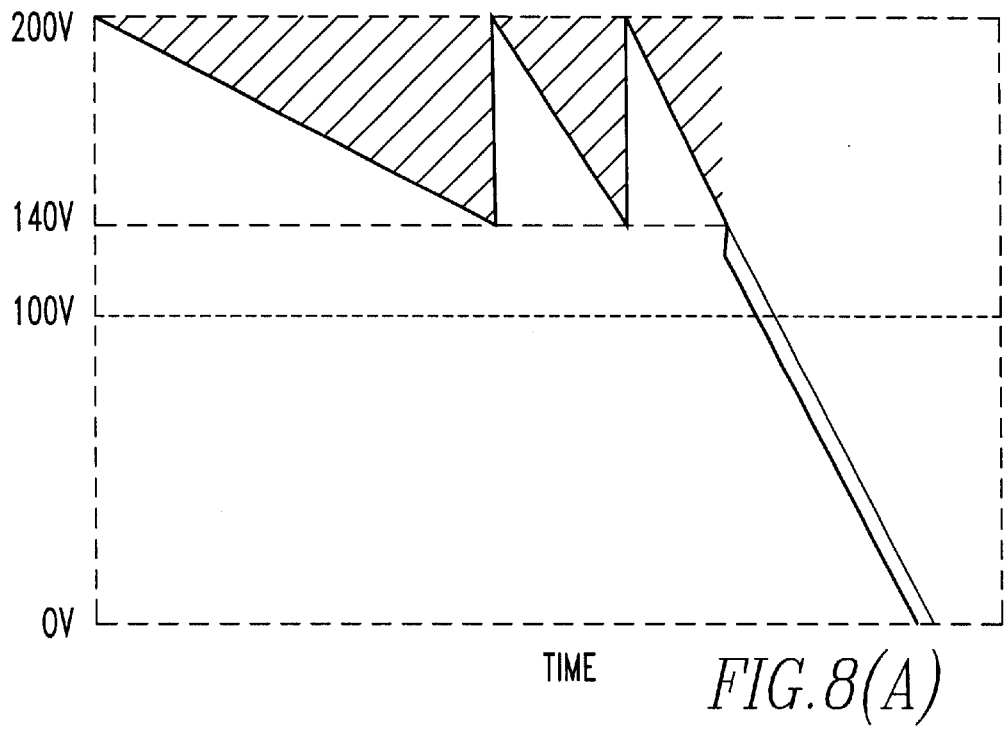
FIGS. 8(A)–8(B) show graphs of transitions of voltage allotment in voltage-compensating circuits.
Figure 8B:
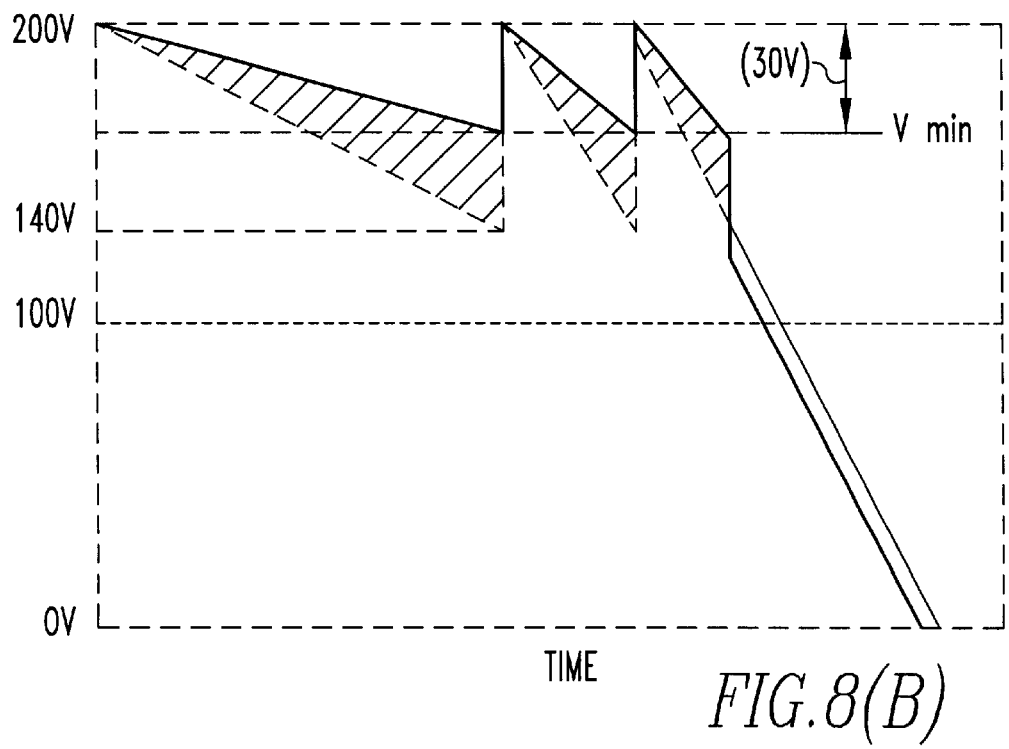
Figure 9:
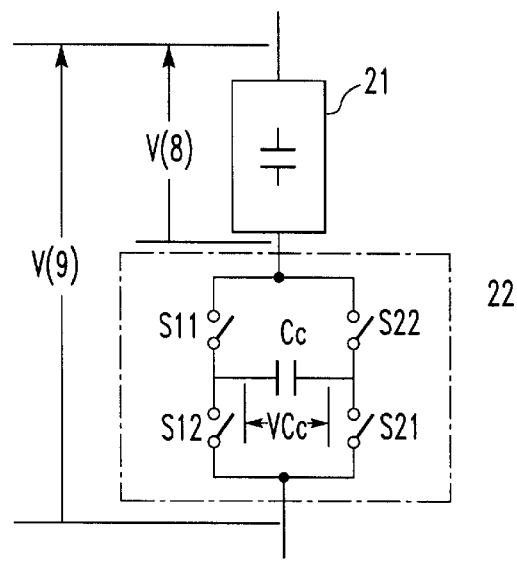
FIG. 9 is a circuit diagram of a power supply system using a capacitor-assisting power supply.
Figure 10:
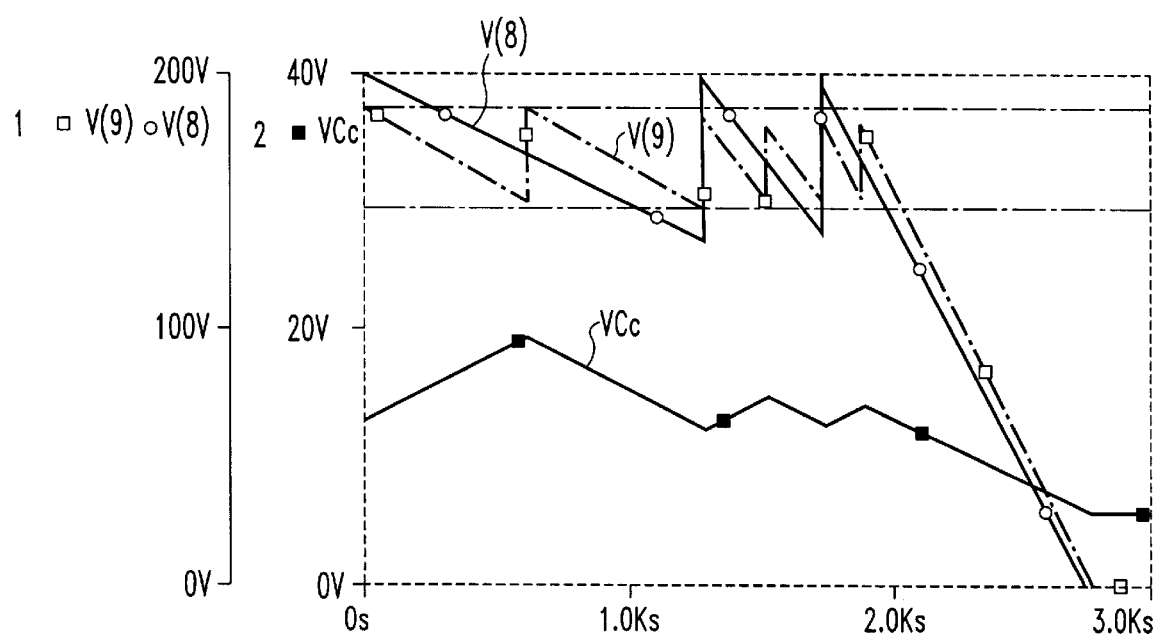
FIG. 10 is a graph showing the operation waveform of a system using the capacitor-assisting power supply shown in FIG. 9.

FIGS. 7(A)–7(C) show diagrams of a further power supply system comprising capacitors connected switchably in accordance with the present invention. FIGS. 8(A) and 8(B) show diagrams depicting examples of transition of voltage allotment in a voltage-compensating circuit. FIG. 9 is a diagram showing an example using a capacitor-assisting power supply. FIG. 10 shows an example of the waveform illustrating the operation where the capacitor-assisting power supply is employed. In these figures, there is shown a power supply 21 comprising capacitors, voltage-compensating circuits 22, 22-1, 22-2, voltage detection circuits 23, 24, a target value-calculating circuit 25, an error-detecting circuit 26, a voltage-compensating control circuit 27, a voltage-compensating capacitor Cc, an output capacitor Co, diodes Dc, Do, a choke coil L, a switching device Sw, and switches S11, S12, S21, S22.

Figure 11A:
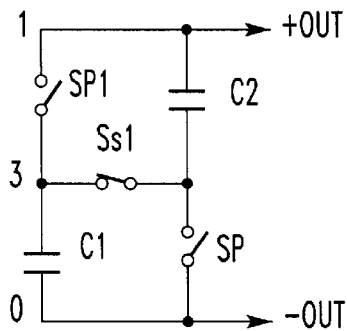
FIGS. 11(A)–11(C) show circuit diagrams of the prior art power supply system comprising capacitors switched between series connection and parallel connection.
Figure 11B:
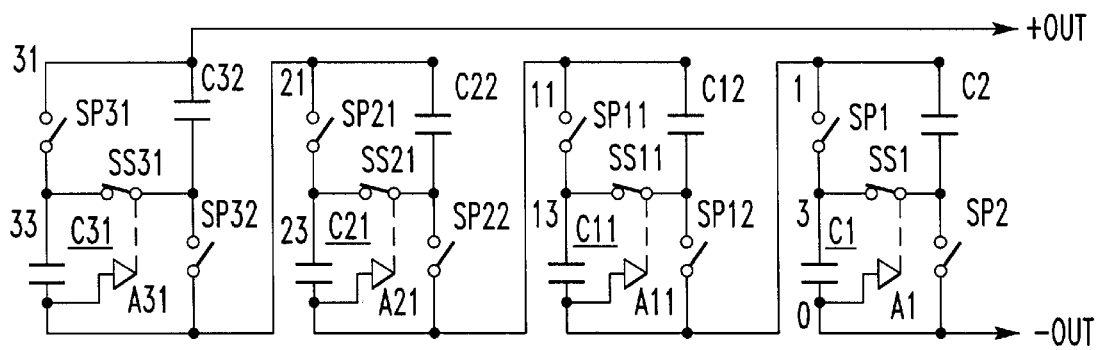
Figure 11C:
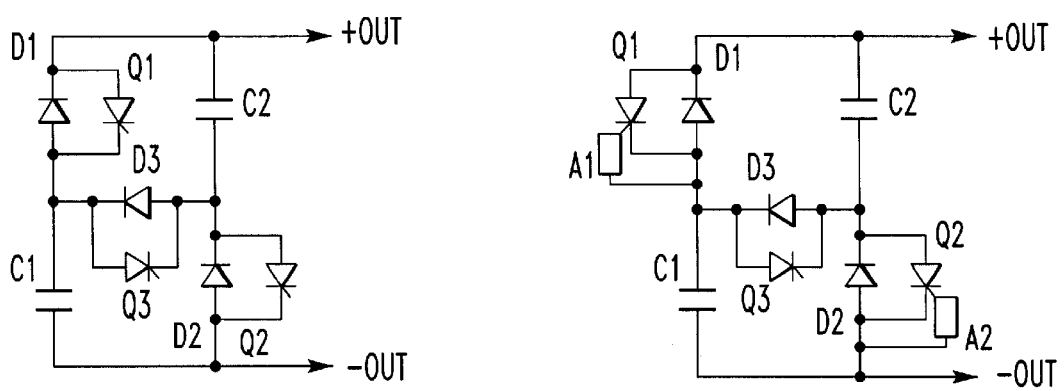

In FIG. 7(A), the power supply 21 comprising capacitors switches the connection of plural capacitors in a stepwise fashion and adjusts the output voltage. For example, this power supply 21 is the power supply already described in connection with FIGS. 1(A)–1(G) and 2(A)–2(F). Furthermore, the power supply 21 may be the power supply shown in FIGS. 11(A)–11(C). In addition, the power supply 21 may be a power supply in which voltage-adjusting capacitors are selectively connected in series with a main capacitor in a stepwise fashion or disconnected from the main capacitor in response to variations in the voltage across the main capacitor.

Each of the voltage-compensating circuits 22, 22-1, and 22-2 is a circuit for compensating for variations in the voltage across the power supply 21, and compensates for the voltage in response to decrease in the voltage from the power supply 21. The voltage detection circuit 23 acts to detect the voltage across the power supply 21 comprising capacitors.

The target value-calculating circuit 25 calculates a target value from the voltage across the capacitor power supply 21. The voltage detection circuit 24 serves to detect the voltage across the voltage-compensating circuit. The error-detecting circuit 26 compares a voltage detected by the voltage detection circuit 24 with a target value calculated by the target value-calculating circuit 25 and produces an error signal corresponding to the difference. The voltage-compensating circuit 27 controls the voltage-compensating circuit according to the error signal such that the voltage across the voltage-compensating circuit becomes equal to the target value.

In the present embodiment, the target value-calculating circuit 25 calculates the target value for the voltage-compensating circuit from the voltage delivered from the capacitor power supply 21. The error-detecting circuit 26 produces the error signal according to the found target value. The voltage-compensating control circuit 27 controls the voltage-compensating circuit 22-2 so that the detected error signal is reduced down to zero. In this way, variations in the voltage across the capacitor power supply 21 are suppressed to some extent. For example, where variations in the voltage across the capacitor power supply 21 should be fully compensated for by the voltage-compensating circuit, the target value-calculating circuit 25 subtracts the voltage across the capacitor power supply 21 from a constant value to obtain a target value. In particular, if the voltage across the capacitor power supply 21 varies from 200 V to about 140 V as indicated by the solid line in FIG. 8(A) whenever the connection is switched, and if the target value-calculating circuit 25 subtracts the voltage across the capacitor power supply 21 from a constant value to obtain a target value, the compensated voltage is kept at 200 V by the compensation made by the voltage-compensating circuit. In this case, the voltage-compensating circuit makes compensation as indicated by the hatching in FIG. 8(A). In consequence, a voltage-compensating capacity up to 60 V is required.

If the voltage is permitted to vary to Vmin (e.g., 30 V) as shown in FIG. 8(B) instead of being suppressed almost completely, the target value can be halved by the target value-calculating circuit 25. Voltage variations ag indicated by the solid line are tolerated. In this case, the voltage-compensating circuit may make voltage compensation corresponding to the hatching. The amount of compensation is half the amount of compensation in the case of complete compensation shown in FIG. 8(A).

Examples of a circuit using step-up type switching converters as the voltage-compensating circuits 22-1 and 22-2 are shown in FIGS. 7(B) and 7(C). The duty cycle of a switching element Sw is controlled according to the error, or difference, between the detected value and a target value, thus controlling the voltage across a voltage-compensating capacitor Cc. If the output voltage Of the whole bank is 200 V, and if the output voltage from the switching converter is limited to 20 V, then the capacity of the converter is only 10% of the capacity where the whole output capacity is controlled by an output converter and taken. For example, a bank producing an output voltage that varies by about 35% would not normally be used in AC-DC converters for power applications or in large-sized motor drivers of more than 100 kV. If variations are suppressed within about 10%, the circuit can be operated in these applications without trouble. Even in this case, the target value calculated by the target value-calculating circuit 25 is set to 25%, and compensation can be made by the voltage-compensating circuit 22.

The voltage-compensating circuit uses a switching converter as mentioned above, In addition, the voltage-compensating capacitor Cc may be connected switchably via selector switches S11, S12, S21, and S22 as shown in FIG. 9. Also, in this case, the polarity of the connected terminal of the voltage-compensating capacitor Cc is switched using a circuit for closing the selector switches S11, S21, a circuit for opening S12, S22, a circuit for opening the selector switches S11, 521, and a circuit for closing S12, S22. Variation of the output voltage V(9) can be nearly halved as shown in FIG. 10. The voltages V(8), V(9), and Vcc are indicated on FIG. 10. (The leftmost vertical scale pertains to voltages V(8) and V(9). The other vertical scale pertains to Vcc.)

It is to be understood that the present invention is not limited to the embodiments described above and that various changes and modifications are possible. For example, in the embodiments described above, control and rectification means are circuits using thyristors (unidirectional control and rectification devices) or triacs (bidirectional control and rectification devices). Obviously, the control and rectification means may contain giant transistors, MOSFETs, other semiconductor control devices, or non-semiconductor control devices. Combinations of them may also be used. In the description provided above, detection of the state of charge for controlling a switching circuit is carried out using the voltage across the main capacitor. Instead, the voltage across other capacitors may be employed. Furthermore, in the embodiments described above, calculations are performed according to the voltage across a capacitor power supply to set a target value for a voltage-compensating circuit. A table holding data indicating the relation between a voltage and a target value may be established. Furthermore, the target value may be set by other calculation.

Having thus described our invention with the detail and particularity required by the Patent Laws, what is desired protected by Letters Patent is set forth in the following claims.

What is claimed is:

1. A power supply system having capacitors switchably connected to produce an adjustable output voltage, said power supply system comprising:

a first set of capacitors connected in series at their series junctions;

a second set of capacitors connected in series at their series junctions, the capacitors of said second set being equal in number with the capacitors of said first set;

a series connection switching means connected with first terminals of the capacitors of said first and second sets to connect said first set of capacitors in series with said second set of capacitors;

input/output terminals connected with second terminals of the capacitors of said first and second sets, said second terminals being not connected with said series connection means;

a first series junction at which said first set of capacitors is connected with said series connection means;

a first set of switching means for connecting said first series junction with terminals of said capacitors of said second set;

a second series junction at which said second set of capacitors is connected with said series connection means;

a second set of switching means for connecting said second series junction with terminals of the capacitors of said first set; and a control means for controlling said first set of switching means, said second set of switching means, and said series connection switching means to switch connections of said capacitors of the first and second sets among a first state in which said first set of capacitors is connected in series with said second set of capacitors, a second state in which said first set of capacitors is connected in parallel with said second set of capacitors, and a third state in which one or more capacitors of said first set are connected in parallel with one or more capacitors of said second set, said first and second sets of switching means enabling multiple groups of one or more capacitors in said first set to be connected in parallel with capacitors in corresponding multiple groups of one or more capacitors in said second set.

2. The power supply system of claim 1, wherein said control means selectively turns on any one pair of switches of said first and second sets symmetrical with respect to said series connection switching means.

3. The power supply system of claim 2, wherein said control means switches said switching means in such a way that whenever a terminal voltage developed across said input/output terminals reaches a given value by charging, said terminal voltage drops by a given small amount.

4. The power supply system of claim 3, wherein said control means turns on said series connection switching means when charging is started.

5. The power supply system of claim 2, wherein said control means switches said switching means in such a way that whenever a terminal voltage developed across said input/output terminals reaches a given value by discharging, said terminal voltage increases by a given small amount.

6. The power supply system of claim 5, wherein said control means controls said switching means to connect said first and second sets of capacitors in parallel with each other when discharging is started.

7. The power supply system of any one of claims 1 to 6, wherein said series connection switching means and said switching means are rectifier elements and control rectifier elements connected anti-parallel.

8. A power supply system having capacitors switchably connected to produce an adjustable output voltage, said power supply system comprising:

a first set of auxiliary capacitors connected in series at their series junctions;

a second set of auxiliary capacitors connected in series at their series junctions, the capacitors of said second set being equal in number with the capacitors of said first set;

a series connection switching means connected with first terminals of the capacitors of said first and second sets to connect said first set of capacitors in series with said second set of capacitors;

input/output terminals connected with second terminals of the capacitors of said first and second sets, said second terminals being not connected with said series connection means;

a first series junction at which said first set of capacitors is connected with said series connection means;

a first set of switching means for connecting said first series junction with said second terminals of said capacitors of said second set and with the series junctions of the capacitors of said second set;

a second series junction at which said second set of capacitors is connected with said series connection means;

a second set of switching means for connecting said second series junction with said second terminals of said capacitors of said first set and with the series junctions of the capacitors of said first set;

a control means for controlling said first set of switching means, said second set of switching means, and said series connection switching means to switch connection of said capacitors of the first and second sets among a first state in which said first set of capacitors is connected in series with said second set of capacitors, a second state in which said first set of capacitors is connected in parallel with said second set of capacitors, and a third state in which one or more capacitors of said first set are connected in parallel with one or more capacitors of said second set, said control means acting to control connection of the capacitors of said first and second sets between series connection and parallel connection, thus adjusting said output voltage; and a main capacitor bank with which said input/output terminals are connected in series.

9. The power supply system of claim 8, wherein said series connection switching means and said switching means are rectifier elements and control rectifier means connected anti-parallel.

* * * * *

UNITED STATES PATENT AND TRADEMARK OFFICE
CERTIFICATE OF CORRECTION

PATENT NO. : 6,317,343 B1
DATED : November 13, 2001
INVENTOR(S) : Michio Okamura et al.

It is certified that error appears in the above-identified patent and that said Letters Patent is hereby corrected as shown below:

<u>Column 6,</u>
Line 20, "SDB-SDB3" should read -- SDB1-SDB3 --.
Line 39, after "with which" insert -- triacs --.

<u>Column 9,</u>
Line 34, "ag indicated" should read -- as indicated --.
Line 46, "voltage Of" should read -- voltage of --.
Line 60, after "above" delete comma (,) and insert period (.).
Line 67, "521" should read -- S21 --.

Signed and Sealed this

Tenth Day of September, 2002

Attest:

JAMES E. ROGAN
Attesting Officer       Director of the United States Patent and Trademark Office